United States Patent
Vasseur et al.

(10) Patent No.: US 11,658,904 B1
(45) Date of Patent: *May 23, 2023

(54) APPLICATION-AWARE ROUTING BASED ON PATH KPI DYNAMICS

(71) Applicant: Cisco Technology, Inc., San Jose, CA (US)

(72) Inventors: Jean-Philippe Vasseur, Saint Martin d'Uriage (FR); Vinay Kumar Kolar, San Jose, CA (US); Sambarta Dasgupta, Sunnyvale, CA (US); Grégory Mermoud, Venthône (CH)

(73) Assignee: Cisco Technology, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/532,114

(22) Filed: Nov. 22, 2021

(51) Int. Cl.
   *G06F 15/16* (2006.01)
   *H04L 45/42* (2022.01)
   *H04L 45/302* (2022.01)
   *H04L 45/02* (2022.01)
   *H04L 45/12* (2022.01)

(52) U.S. Cl.
   CPC .............. *H04L 45/42* (2013.01); *H04L 45/02* (2013.01); *H04L 45/124* (2013.01); *H04L 45/302* (2013.01)

(58) Field of Classification Search
   CPC .......................... H04L 45/124; H04L 45/302
   See application file for complete search history.

(56) References Cited

U.S. PATENT DOCUMENTS

| | | | |
|---|---|---|---|
| 8,842,578 B1* | 9/2014 | Zisapel | H04L 43/20 370/255 |
| 10,110,467 B2 | 10/2018 | Thyni et al. | |
| 10,637,767 B2 | 4/2020 | Nauck et al. | |
| 10,972,387 B2 | 4/2021 | Iyer et al. | |
| 11,323,312 B1* | 5/2022 | Banka | H04L 43/0829 |
| 11,398,959 B2* | 7/2022 | Yelahanka Raghuprasad | H04L 45/08 |
| 2009/0018798 A1* | 1/2009 | Dorneich | G06F 17/18 702/179 |
| 2016/0211988 A1* | 7/2016 | Lucas | H04L 45/22 |
| 2017/0373950 A1* | 12/2017 | Szilagyi | H04L 43/091 |
| 2018/0123901 A1* | 5/2018 | Yermakov | H04L 43/0894 |
| 2019/0098067 A1* | 3/2019 | Sandoval | H02J 13/00024 |
| 2020/0021493 A1* | 1/2020 | Karacali-Akyamac | H04L 43/087 |
| 2020/0084142 A1* | 3/2020 | Bochkar | H04L 47/125 |
| 2020/0112504 A1* | 4/2020 | Osman | H04L 47/2475 |

(Continued)

OTHER PUBLICATIONS

Winter, et al. "RPL: IPv6 Routing Protocol for Low-Power and Lossy Networks", Request for Comments: 6550, Mar. 2012, 157 pages, Internet Engineering Task Force Trust.

(Continued)

*Primary Examiner* — Hieu T Hoang
(74) *Attorney, Agent, or Firm* — Behmke Innovation Group LLC; Kenneth J. Heywood; Jonathon P. Western

(57) ABSTRACT

In one embodiment, a device receives path telemetry data for one or more network paths in a network over which traffic for an online application is conveyed. The device computes time series dynamics for the path telemetry data. The device determines a mapping of the time series dynamics to application experience metrics for the online application. The device routes traffic associated with the online application based on the mapping.

20 Claims, 13 Drawing Sheets

(56) References Cited

U.S. PATENT DOCUMENTS

| | | | | |
|---|---|---|---|---|
| 2020/0153701 A1* | 5/2020 | Mohan | .................. | H04L 47/365 |
| 2020/0267114 A1* | 8/2020 | Ramamurthy | ........ | H04L 47/125 |
| 2020/0287790 A1* | 9/2020 | Srinivas | .................. | H04L 43/12 |
| 2020/0296011 A1* | 9/2020 | Jain | ......................... | H04L 41/40 |
| 2020/0296023 A1* | 9/2020 | Kumar | .................. | H04L 43/103 |
| 2020/0382387 A1* | 12/2020 | Pasupathy | ............ | H04L 47/2425 |
| 2021/0044530 A1 | 2/2021 | Dhanabalan et al. | | |
| 2021/0112008 A1* | 4/2021 | Rahouti | .................. | H04L 45/02 |
| 2021/0303969 A1* | 9/2021 | Amiri | .................. | G06N 3/0445 |
| 2022/0021595 A1* | 1/2022 | Kumar | ..................... | H04L 1/18 |
| 2022/0021598 A1* | 1/2022 | Gupta | ..................... | H04L 43/02 |
| 2022/0052927 A1* | 2/2022 | Yelahanka Raghuprasad | ............. H04L 45/50 | |

OTHER PUBLICATIONS

"Section 1.5. Routing in the ARPANET", online: https://flylib.com/books/en/2.297.1.16/1/, accessed Oct. 18, 2021, 6 pages.

Jahromi, et al., "Towards Application-Aware Networking: ML-Based End-to-End Application KPI/QoE Metrics Characterization in SDN", Conference: 2018 Tenth International Conference on Ubiquitous and Future Networks (ICUFN), Jul. 2018, pp. 126-131, IEEE, Prague, Czech Republic.

* cited by examiner

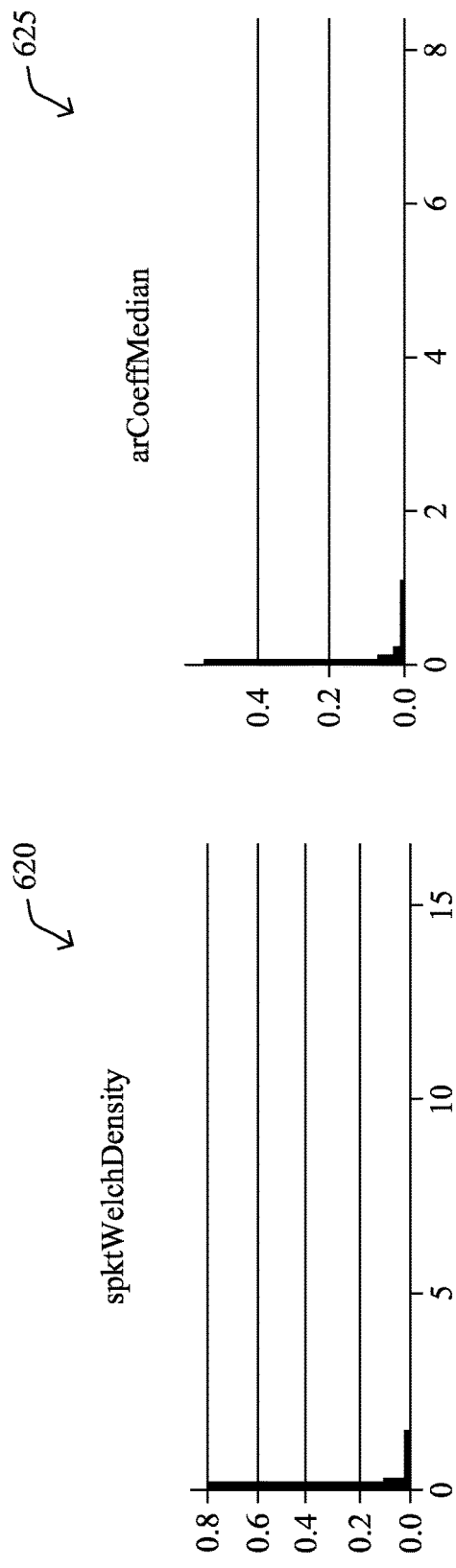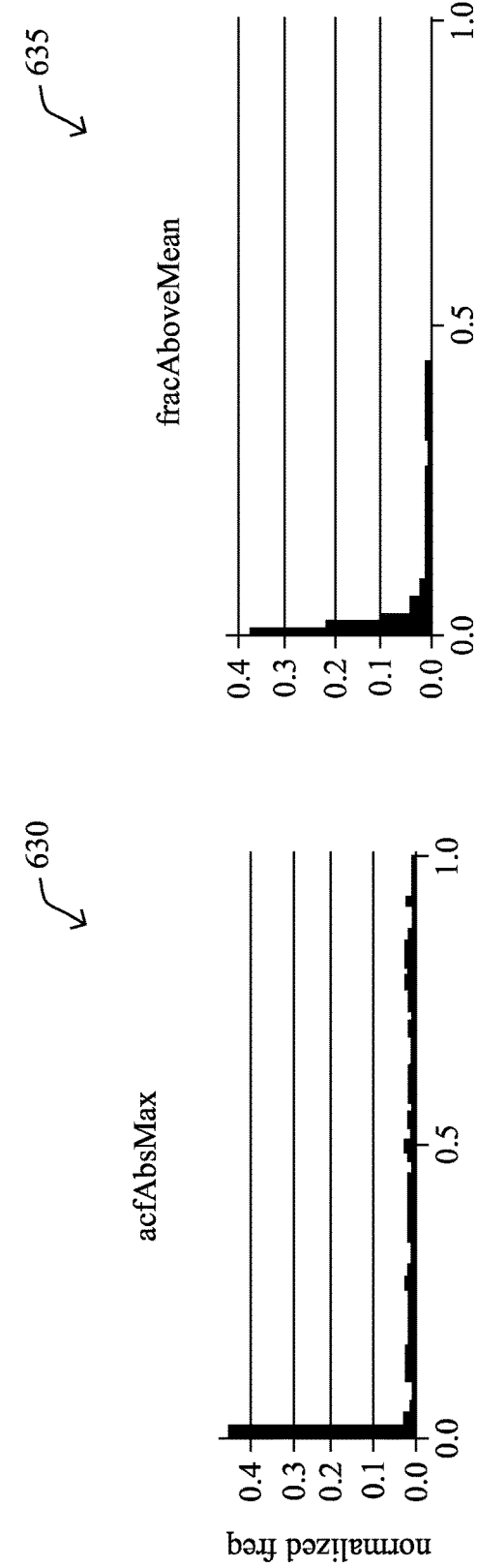
FIG. 6E
FIG. 6F
FIG. 6G
FIG. 6H

APPLICATION-AWARE ROUTING BASED ON PATH KPI DYNAMICS

TECHNICAL FIELD

The present disclosure relates generally to computer networks, and, more particularly, to application-aware routing based on path key performance indicator (KPI) dynamics.

BACKGROUND

Software-defined wide area networks (SD-WANs) represent the application of software-defined networking (SDN) principles to WAN connections, such as connections to cellular networks, the Internet, and Multiprotocol Label Switching (MPLS) networks. The power of SD-WAN is the ability to provide consistent service level agreement (SLA) for important application traffic transparently across various underlying tunnels of varying transport quality and allow for seamless tunnel selection based on tunnel performance characteristics that can match application SLAs and satisfy the quality of service (QoS) requirements of the traffic (e.g., in terms of delay, jitter, packet loss, etc.).

Traditionally, routing decisions have been based on static metrics, such as the delay, jitter, packet loss, etc. along a path, in order to satisfy a specified SLA. In other words, SLA violations are often used as a proxy for degraded application experience. However, many online applications are now resilient to certain types of SLA violations, meaning that a user may not even notice certain types of SLA violations.

BRIEF DESCRIPTION OF THE DRAWINGS

The embodiments herein may be better understood by referring to the following description in conjunction with the accompanying drawings in which like reference numerals indicate identically or functionally similar elements, of which:

FIGS. 6A-6L illustrates example plots of KPI dynamics;

DESCRIPTION OF EXAMPLE EMBODIMENTS

Overview

Figure 1A:
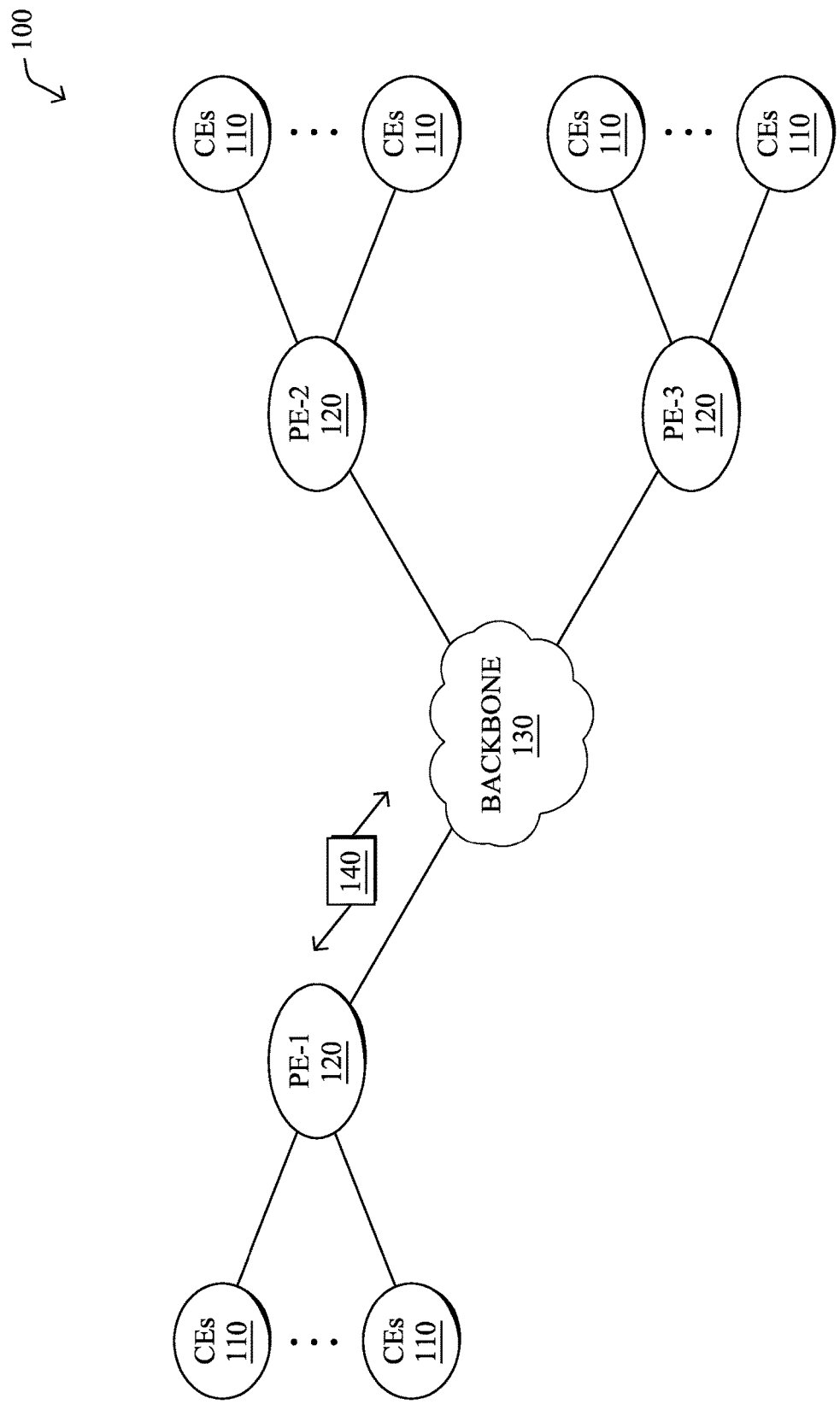
FIGS. 1A-1B illustrate an example communication network.

According to one or more embodiments of the disclosure, a device receives path telemetry data for one or more network paths in a network over which traffic for an online application is conveyed. The device computes time series dynamics for the path telemetry data. The device determines a mapping of the time series dynamics to application experience metrics for the online application. The device routes traffic associated with the online application based on the mapping.

DESCRIPTION

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links, or Powerline Communications (PLC) such as IEEE 61334, IEEE P1901.2, and others. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

FIG. 1A is a schematic block diagram of an example computer network 100 illustratively comprising nodes/devices, such as a plurality of routers/devices interconnected by links or networks, as shown. For example, customer edge (CE) routers 110 may be interconnected with provider edge (PE) routers 120 (e.g., PE-1, PE-2, and PE-3) in order to communicate across a core network, such as an illustrative network backbone 130. For example, routers 110, 120 may be interconnected by the public Internet, a multiprotocol label switching (MPLS) virtual private network (VPN), or the like. Data packets 140 (e.g., traffic/messages) may be exchanged among the nodes/devices of the computer network 100 over links using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

In some implementations, a router or a set of routers may be connected to a private network (e.g., dedicated leased lines, an optical network, etc.) or a virtual private network (VPN), such as an MPLS VPN thanks to a carrier network, via one or more links exhibiting very different network and service level agreement characteristics. For the sake of illustration, a given customer site may fall under any of the following categories:

1.) Site Type A: a site connected to the network (e.g., via a private or VPN link) using a single CE router and a single link, with potentially a backup link (e.g., a 3G/4G/5G/LTE backup connection). For example, a particular CE router 110 shown in network 100 may support a given customer site, potentially also with a backup link, such as a wireless connection.

2.) Site Type B: a site connected to the network by the CE router via two primary links (e.g., from different Service Providers), with potentially a backup link (e.g., a 3G/4G/5G/LTE connection). A site of type B may itself be of different types:

2a.) Site Type B1: a site connected to the network using two MPLS VPN links (e.g., from different Service Providers), with potentially a backup link (e.g., a 3G/4G/5G/LTE connection).

2b.) Site Type B2: a site connected to the network using one MPLS VPN link and one link connected to the public Internet, with potentially a backup link (e.g., a 3G/4G/5G/LTE connection). For example, a particular customer site may be connected to network 100 via PE-3 and via a separate Internet connection, potentially also with a wireless backup link.

2c.) Site Type B3: a site connected to the network using two links connected to the public Internet, with potentially a backup link (e.g., a 3G/4G/5G/LTE connection).

Notably, MPLS VPN links are usually tied to a committed service level agreement, whereas Internet links may either have no service level agreement at all or a loose service level agreement (e.g., a "Gold Package" Internet service connection that guarantees a certain level of performance to a customer site).

3.) Site Type C: a site of type B (e.g., types B1, B2 or B3) but with more than one CE router (e.g., a first CE router connected to one link while a second CE router is connected to the other link), and potentially a backup link (e.g., a wireless 3G/4G/5G/LTE backup link). For example, a particular customer site may include a first CE router 110 connected to PE-2 and a second CE router 110 connected to PE-3.

Figure 1B:
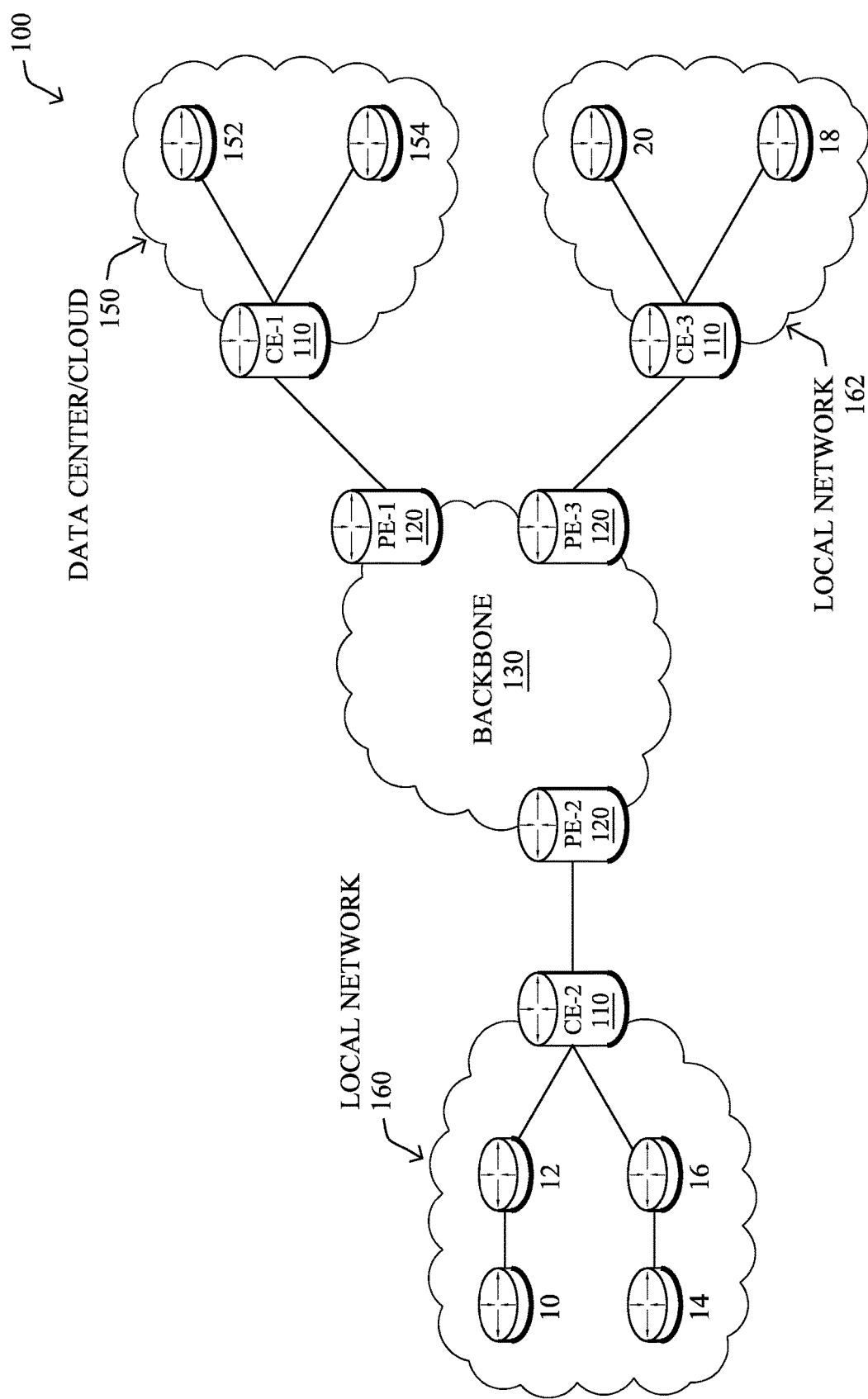

FIG. 1B illustrates an example of network 100 in greater detail, according to various embodiments. As shown, network backbone 130 may provide connectivity between devices located in different geographical areas and/or different types of local networks. For example, network 100 may comprise local/branch networks 160, 162 that include devices/nodes 10-16 and devices/nodes 18-20, respectively, as well as a data center/cloud environment 150 that includes servers 152-154. Notably, local networks 160-162 and data center/cloud environment 150 may be located in different geographic locations.

Servers 152-154 may include, in various embodiments, a network management server (NMS), a dynamic host configuration protocol (DHCP) server, a constrained application protocol (CoAP) server, an outage management system (OMS), an application policy infrastructure controller (APIC), an application server, etc. As would be appreciated, network 100 may include any number of local networks, data centers, cloud environments, devices/nodes, servers, etc.

In some embodiments, the techniques herein may be applied to other network topologies and configurations. For example, the techniques herein may be applied to peering points with high-speed links, data centers, etc.

According to various embodiments, a software-defined WAN (SD-WAN) may be used in network 100 to connect local network 160, local network 162, and data center/cloud environment 150. In general, an SD-WAN uses a software defined networking (SDN)-based approach to instantiate tunnels on top of the physical network and control routing decisions, accordingly. For example, as noted above, one tunnel may connect router CE-2 at the edge of local network 160 to router CE-1 at the edge of data center/cloud environment 150 over an MPLS or Internet-based service provider network in backbone 130. Similarly, a second tunnel may also connect these routers over a 4G/5G/LTE cellular service provider network. SD-WAN techniques allow the WAN functions to be virtualized, essentially forming a virtual connection between local network 160 and data center/cloud environment 150 on top of the various underlying connections. Another feature of SD-WAN is centralized management by a supervisory service that can monitor and adjust the various connections, as needed.

Figure 2:
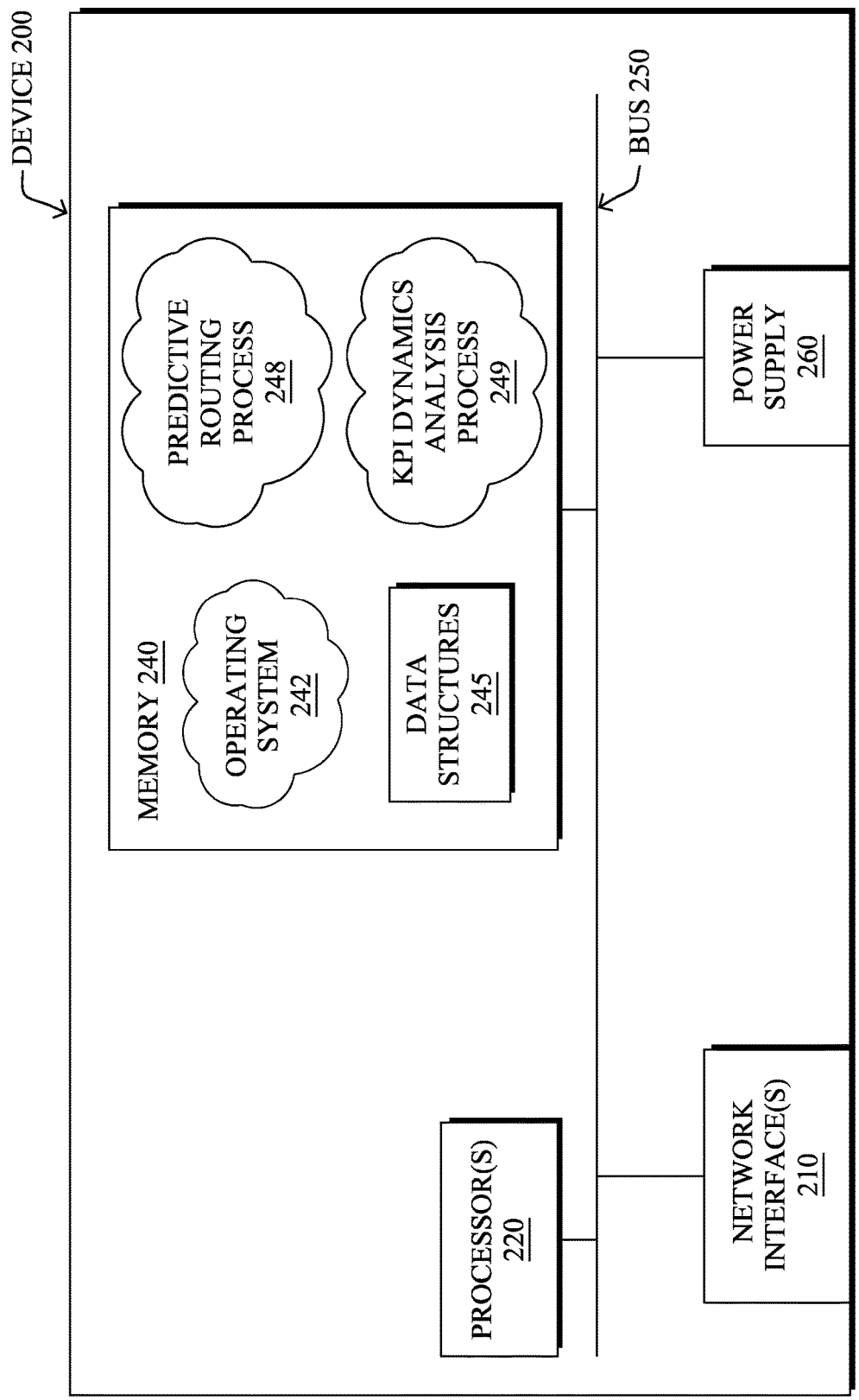
FIG. 2 illustrates an example network device/node.

FIG. 2 is a schematic block diagram of an example node/device 200 (e.g., an apparatus) that may be used with one or more embodiments described herein, e.g., as any of the computing devices shown in FIGS. 1A-1B, particularly the PE routers 120, CE routers 110, nodes/device 10-20, servers 152-154 (e.g., a network controller/supervisory service located in a data center, etc.), any other computing device that supports the operations of network 100 (e.g., switches, etc.), or any of the other devices referenced below. The device 200 may also be any other suitable type of device depending upon the type of network architecture in place, such as IoT nodes, etc. Device 200 comprises one or more network interfaces 210, one or more processors 220, and a memory 240 interconnected by a system bus 250, and is powered by a power supply 260.

The network interfaces 210 include the mechanical, electrical, and signaling circuitry for communicating data over physical links coupled to the network 100. The network interfaces may be configured to transmit and/or receive data using a variety of different communication protocols. Notably, a physical network interface 210 may also be used to implement one or more virtual network interfaces, such as for virtual private network (VPN) access, known to those skilled in the art.

The memory 240 comprises a plurality of storage locations that are addressable by the processor(s) 220 and the network interfaces 210 for storing software programs and data structures associated with the embodiments described herein. The processor 220 may comprise necessary elements or logic adapted to execute the software programs and manipulate the data structures 245. An operating system 242 (e.g., the Internetworking Operating System, or IOS®, of Cisco Systems, Inc., another operating system, etc.), portions of which are typically resident in memory 240 and executed by the processor(s), functionally organizes the node by, inter alia, invoking network operations in support of software processors and/or services executing on the device. These software processors and/or services may comprise a predictive routing process 248 and/or a KPI dynamics analysis process 249, as described herein, any of which may alternatively be located within individual network interfaces.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

In general, predictive routing process 248 and/or KPI dynamics analysis process 249 include computer executable instructions executed by the processor 220 to perform routing functions in conjunction with one or more routing protocols. These functions may, on capable devices, be configured to manage a routing/forwarding table (a data structure 245) containing, e.g., data used to make routing/forwarding decisions. In various cases, connectivity may be discovered and known, prior to computing routes to any destination in the network, e.g., link state routing such as Open Shortest Path First (OSPF), or Intermediate-System-to-Intermediate-System (ISIS), or Optimized Link State Routing (OLSR). For instance, paths may be computed using a shortest path first (SPF) or constrained shortest path first (CSPF) approach. Conversely, neighbors may first be discovered (e.g., a priori knowledge of network topology is not known) and, in response to a needed route to a destination, send a route request into the network to determine which neighboring node may be used to reach the desired destination. Example protocols that take this approach include Ad-hoc On-demand Distance Vector (AODV), Dynamic Source Routing (DSR), DYnamic MANET On-demand Routing (DYMO), etc.

In various embodiments, as detailed further below, predictive routing process 248 and/or KPI dynamics analysis process 249 may include computer executable instructions that, when executed by processor(s) 220, cause device 200 to perform the techniques described herein. To do so, in some embodiments, predictive routing process 248 and/or KPI dynamics analysis process 249 may utilize machine learning. In general, machine learning is concerned with the design and the development of techniques that take as input empirical data (such as network statistics and performance indicators), and recognize complex patterns in these data. One very common pattern among machine learning techniques is the use of an underlying model M, whose parameters are optimized for minimizing the cost function associated to M, given the input data. For instance, in the context of classification, the model M may be a straight line that separates the data into two classes (e.g., labels) such that $M=a*x+b*y+c$ and the cost function would be the number of misclassified points. The learning process then operates by adjusting the parameters a,b,c such that the number of misclassified points is minimal. After this optimization phase (or learning phase), the model M can be used very easily to classify new data points. Often, M is a statistical model, and the cost function is inversely proportional to the likelihood of M, given the input data.

In various embodiments, predictive routing process 248 and/or KPI dynamics analysis process 249 may employ one or more supervised, unsupervised, or semi-supervised machine learning models. Generally, supervised learning entails the use of a training set of data, as noted above, that is used to train the model to apply labels to the input data. For example, the training data may include sample telemetry that has been labeled as being indicative of an acceptable performance or unacceptable performance. On the other end of the spectrum are unsupervised techniques that do not require a training set of labels. Notably, while a supervised learning model may look for previously seen patterns that have been labeled as such, an unsupervised model may instead look to whether there are sudden changes or patterns in the behavior of the metrics. Semi-supervised learning models take a middle ground approach that uses a greatly reduced set of labeled training data.

Example machine learning techniques that predictive routing process 248 and/or KPI dynamics analysis process 249 can employ may include, but are not limited to, nearest neighbor (NN) techniques (e.g., k-NN models, replicator NN models, etc.), statistical techniques (e.g., Bayesian networks, etc.), clustering techniques (e.g., k-means, mean-shift, etc.), neural networks (e.g., reservoir networks, artificial neural networks, etc.), support vector machines (SVMs), logistic or other regression, Markov models or chains, principal component analysis (PCA) (e.g., for linear models), singular value decomposition (SVD), multi-layer perceptron (MLP) artificial neural networks (ANNs) (e.g., for non-linear models), replicating reservoir networks (e.g., for non-linear models, typically for time series), random forest classification, or the like.

The performance of a machine learning model can be evaluated in a number of ways based on the number of true positives, false positives, true negatives, and/or false negatives of the model. For example, consider the case of a model that predicts whether the QoS of a path will satisfy the service level agreement (SLA) of the traffic on that path. In such a case, the false positives of the model may refer to the number of times the model incorrectly predicted that the QoS of a particular network path will not satisfy the SLA of the traffic on that path. Conversely, the false negatives of the model may refer to the number of times the model incorrectly predicted that the QoS of the path would be acceptable. True negatives and positives may refer to the number of times the model correctly predicted acceptable path performance or an SLA violation, respectively. Related to these measurements are the concepts of recall and precision. Generally, recall refers to the ratio of true positives to the sum of true positives and false negatives, which quantifies the sensitivity of the model. Similarly, precision refers to the ratio of true positives the sum of true and false positives.

As noted above, in software defined WANs (SD-WANs), traffic between individual sites are sent over tunnels. The tunnels are configured to use different switching fabrics, such as MPLS, Internet, 4G or 5G, etc. Often, the different switching fabrics provide different QoS at varied costs. For example, an MPLS fabric typically provides high QoS when compared to the Internet, but is also more expensive than traditional Internet. Some applications requiring high QoS (e.g., video conferencing, voice calls, etc.) are traditionally sent over the more costly fabrics (e.g., MPLS), while applications not needing strong guarantees are sent over cheaper fabrics, such as the Internet.

Traditionally, network policies map individual applications to Service Level Agreements (SLAs), which define the satisfactory performance metric(s) for an application, such as loss, latency, or jitter. Similarly, a tunnel is also mapped to the type of SLA that is satisfies, based on the switching fabric that it uses. During runtime, the SD-WAN edge router then maps the application traffic to an appropriate tunnel.

Currently, the mapping of SLAs between applications and tunnels is performed manually by an expert, based on their experiences and/or reports on the prior performances of the applications and tunnels.

The emergence of infrastructure as a service (IaaS) and software-as-a-service (SaaS) is having a dramatic impact of the overall Internet due to the extreme virtualization of services and shift of traffic load in many large enterprises. Consequently, a branch office or a campus can trigger massive loads on the network.

Figure 3A:
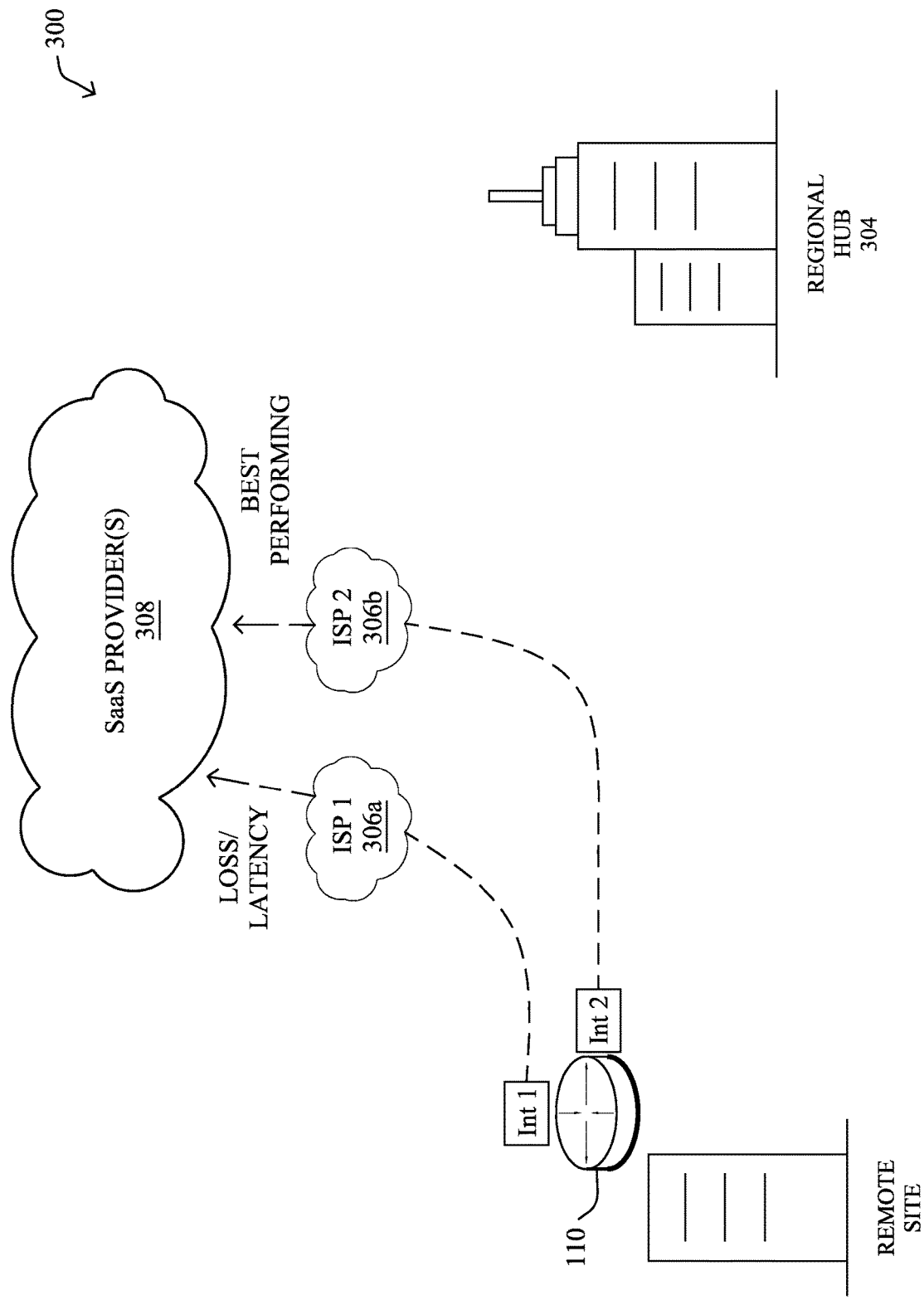
FIGS. 3A-3B illustrate example network deployments.
Figure 3B:
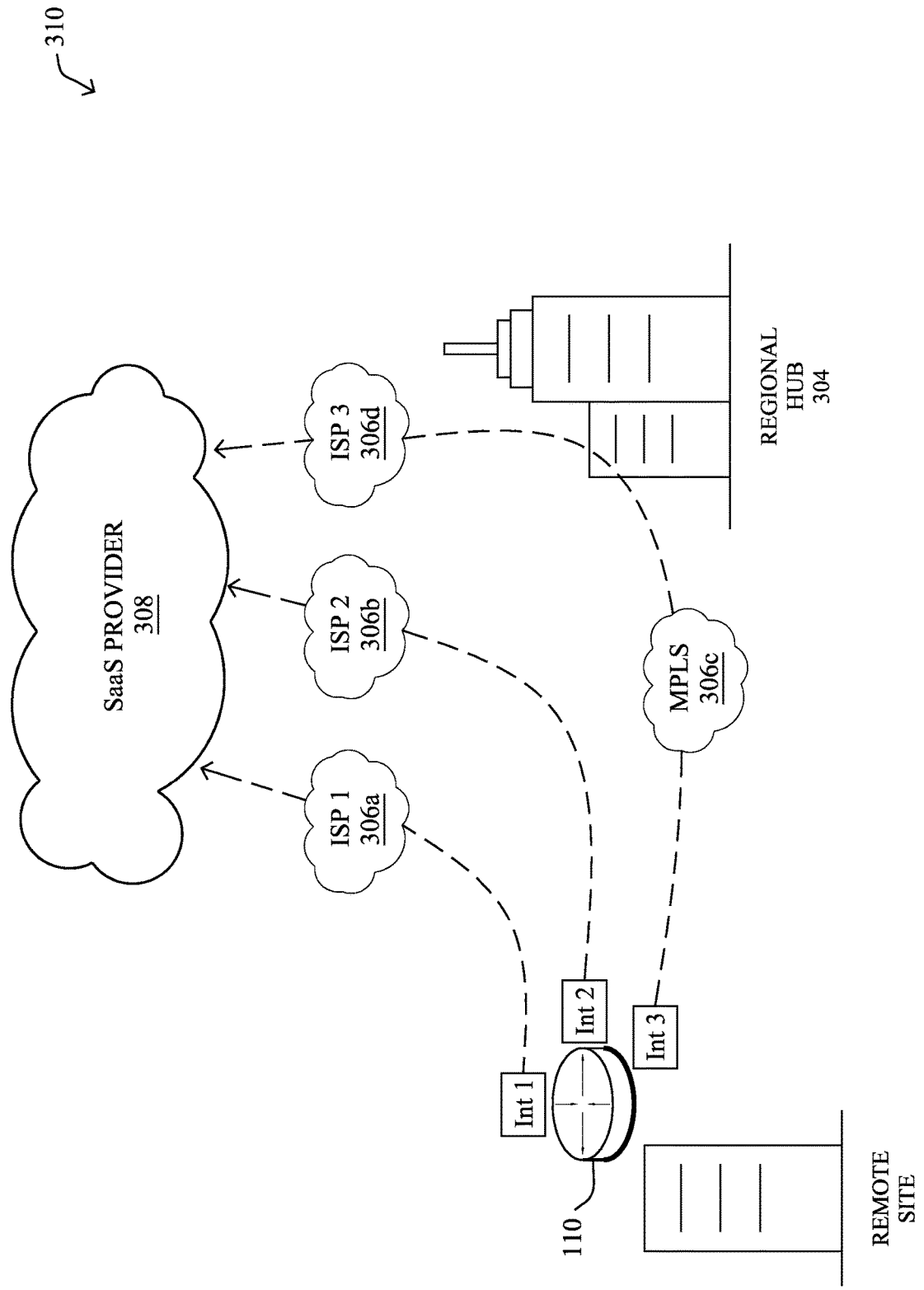

FIGS. 3A-3B illustrate example network deployments 300, 310, respectively. As shown, a router 110 located at the edge of a remote site 302 may provide connectivity between a local area network (LAN) of the remote site 302 and one or more cloud-based, SaaS providers 308. For example, in the case of an SD-WAN, router 110 may provide connectivity to SaaS provider(s) 308 via tunnels across any number of networks 306. This allows clients located in the LAN of remote site 302 to access cloud applications (e.g., Office 365™, Dropbox™, etc.) served by SaaS provider(s) 308.

As would be appreciated, SD-WANs allow for the use of a variety of different pathways between an edge device and an SaaS provider. For example, as shown in example network deployment 300 in FIG. 3A, router 110 may utilize two Direct Internet Access (DIA) connections to connect with SaaS provider(s) 308. More specifically, a first interface of router 110 (e.g., a network interface 210, described previously), Int 1, may establish a first communication path (e.g., a tunnel) with SaaS provider(s) 308 via a first Internet Service Provider (ISP) 306a, denoted ISP 1 in FIG. 3A. Likewise, a second interface of router 110, Int 2, may establish a backhaul path with SaaS provider(s) 308 via a second ISP 306b, denoted ISP 2 in FIG. 3A.

FIG. 3B illustrates another example network deployment 310 in which Int 1 of router 110 at the edge of remote site 302 establishes a first path to SaaS provider(s) 308 via ISP 1 and Int 2 establishes a second path to SaaS provider(s) 308 via a second ISP 306b. In contrast to the example in FIG. 3A, Int 3 of router 110 may establish a third path to SaaS provider(s) 308 via a private corporate network 306c (e.g., an MPLS network) to a private data center or regional hub 304 which, in turn, provides connectivity to SaaS provider(s) 308 via another network, such as a third ISP 306d.

Regardless of the specific connectivity configuration for the network, a variety of access technologies may be used (e.g., ADSL, 4G, 5G etc.) in all cases, as well as various networking technologies (e.g., public Internet, MPLS (with or without strict SLA), etc.) to connect the LAN of remote site 302 to SaaS provider(s) 308. Other deployments scenarios are also possible, such as using Colo, accessing SaaS provider(s) 308 via Zscaler or Umbrella services, and the like.

Figure 4A:
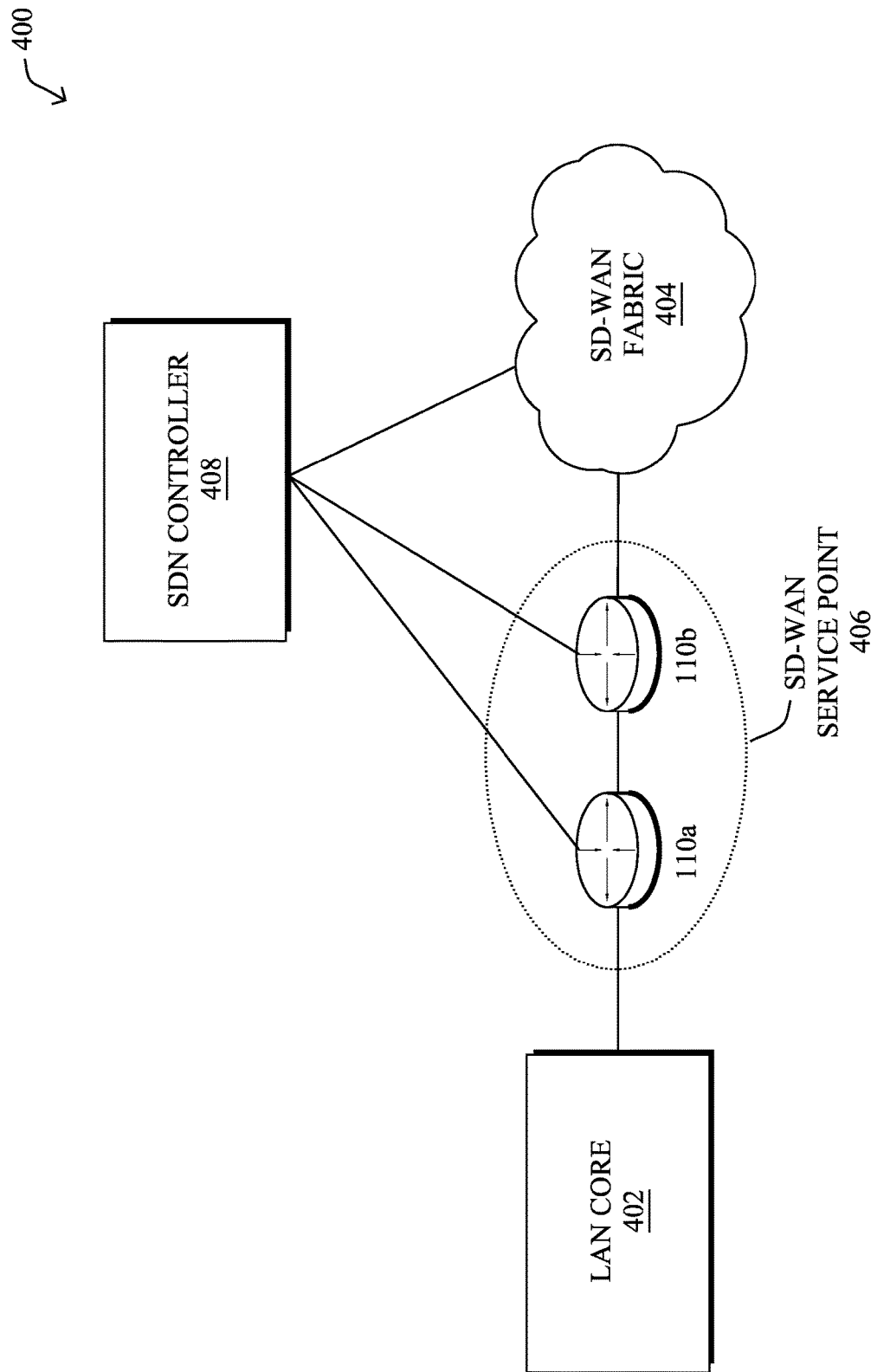
FIGS. 4A-4B illustrate example software defined network (SDN) implementations.

FIG. 4A illustrates an example SDN implementation 400, according to various embodiments. As shown, there may be a LAN core 402 at a particular location, such as remote site 302 shown previously in FIGS. 3A-3B. Connected to LAN core 402 may be one or more routers that form an SD-WAN service point 406 which provides connectivity between LAN core 402 and SD-WAN fabric 404. For instance, SD-WAN service point 406 may comprise routers 110a-110b.

Overseeing the operations of routers 110a-110b in SD-WAN service point 406 and SD-WAN fabric 404 may be an SDN controller 408. In general, SDN controller 408 may comprise one or more devices (e.g., a device 200) configured to provide a supervisory service, typically hosted in the cloud, to SD-WAN service point 406 and SD-WAN fabric 404. For instance, SDN controller 408 may be responsible for monitoring the operations thereof, promulgating policies (e.g., security policies, etc.), installing or adjusting IPsec routes/tunnels between LAN core 402 and remote destinations such as regional hub 304 and/or SaaS provider(s) 308 in FIGS. 3A-3B, and the like.

As noted above, a primary networking goal may be to design and optimize the network to satisfy the requirements of the applications that it supports. So far, though, the two worlds of "applications" and "networking" have been fairly siloed. More specifically, the network is usually designed in order to provide the best SLA in terms of performance and reliability, often supporting a variety of Class of Service (CoS), but unfortunately without a deep understanding of the actual application requirements. On the application side, the networking requirements are often poorly understood even for very common applications such as voice and video for which a variety of metrics have been developed over the past two decades, with the hope of accurately representing the Quality of Experience (QoE) from the standpoint of the users of the application.

More and more applications are moving to the cloud and many do so by leveraging an SaaS model. Consequently, the number of applications that became network-centric has grown approximately exponentially with the raise of SaaS applications, such as Office 365, ServiceNow, SAP, voice, and video, to mention a few. All of these applications rely heavily on private networks and the Internet, bringing their own level of dynamicity with adaptive and fast changing workloads. Orr the network side, SD-WAN provides a high degree of flexibility allowing for efficient configuration management using SDN controllers with the ability to benefit from a plethora of transport access (e.g., MPLS, Internet with supporting multiple CoS, LTE, satellite links, etc.), multiple classes of service and policies to reach private and public networks via multi-cloud SaaS.

Furthermore, the level of dynamicity observed in today's network has never been so high. Millions of paths across thousands of Service Provides (SPs) and a number of SaaS applications have shown that the overall QoS(s) of the network in terms of delay, packet loss, jitter, etc. drastically vary with the region, SP, access type, as well as over time with high granularity. The immediate consequence is that the environment is highly dynamic due to:

New in-house applications being deployed;
New SaaS applications being deployed everywhere in the network, hosted by a number of different cloud providers;
Internet, MPLS, LTE transports providing highly varying performance characteristics, across time and regions;
SaaS applications themselves being highly dynamic: it is common to see new servers deployed in the network. DNS resolution allows the network for being informed of a new server deployed in the network leading to a new destination and a potentially shift of traffic towards a new destination without being even noticed.

According to various embodiments, application aware routing usually refers to the ability to rout traffic so as to satisfy the requirements of the application, as opposed to exclusively relying on the (constrained) shortest path to reach a destination IP address, Various attempts have been made to extend the notion of routing, CSPF, link state routing protocols (ISIS, OSPF, etc.) using various metrics (e.g., Multi-topology Routing) where each metric would reflect a different path attribute (e.g., delay, loss, latency, etc.), but each time with a static metric. At best, current approaches rely on SLA templates specifying the application requirements so as for a given path (e.g., a tunnel) to be "eligible" to carry traffic for the application. In turn, application SLAs are checked using regular probing. Other solutions compute a metric reflecting a particular network characteristic (e.g., delay, throughput, etc.) and then selecting the supposed 'best path,' according to the metric.

The term 'SLA failure' refers to a situation in which the SLA for a given application, often expressed as a function of delay, loss, or jitter, is not satisfied by the current network path for the traffic of a given application. This leads to poor QoE from the standpoint of the users of the application. Modern SaaS solutions like Viptela, CloudonRamp SaaS, and the like, allow for the computation of per application QoE by sending HyperText Transfer Protocol (HTTP) probes along various paths from a branch office and then route the application's traffic along a path having the best QoE for the application. At a first sight, such an approach may solve many problems. Unfortunately, though, there are several shortcomings to this approach:

The SLA for the application is 'guessed,' using static thresholds.

Routing is still entirely reactive: decisions are made using probes that reflect the status of a path at a given time, in contrast with the notion of an informed decision.

SLA failures are very common in the Internet and a good proportion of them could be avoided (e.g., using an alternate path), if predicted in advance.

Figure 4B:
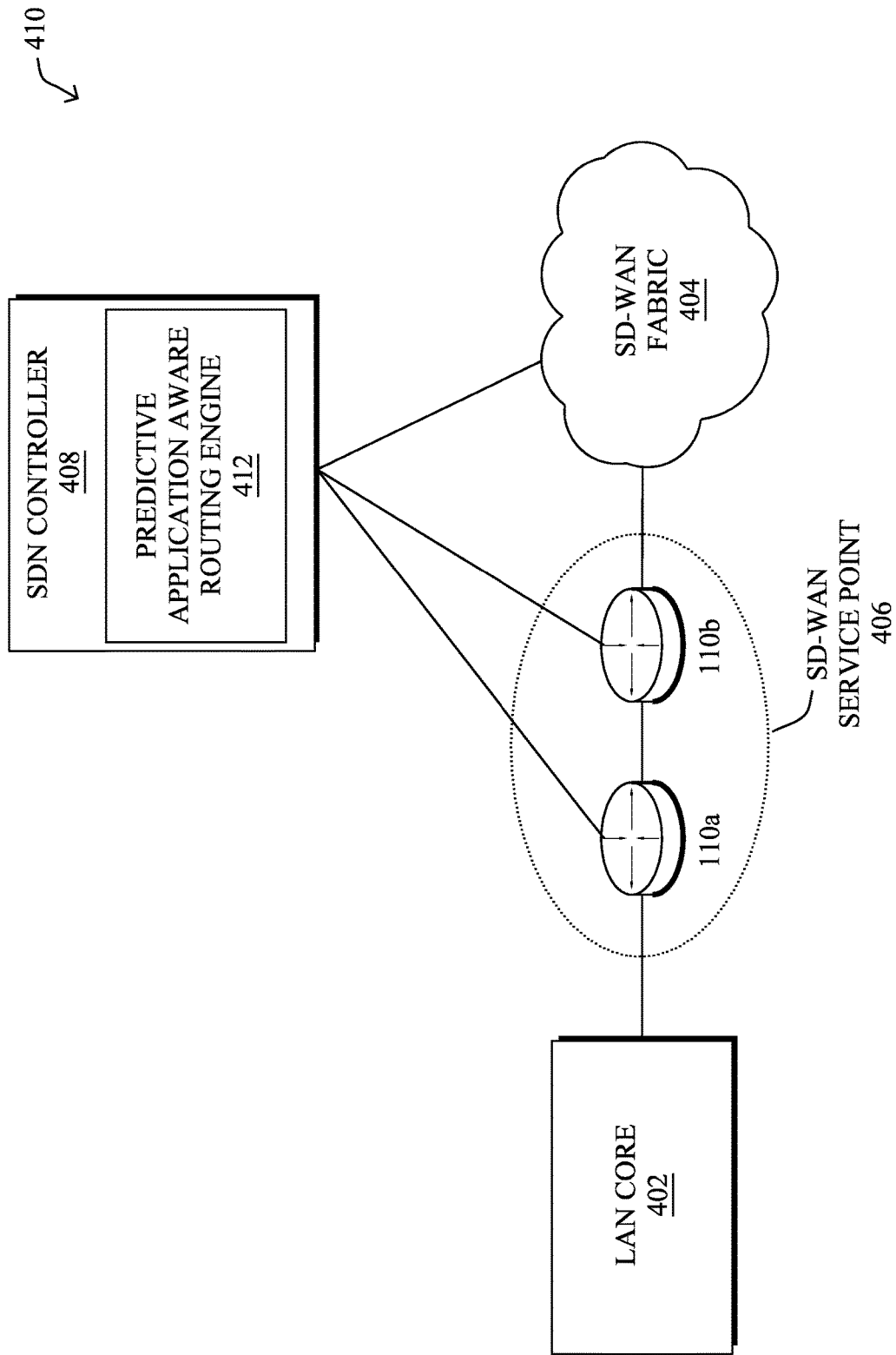

In various embodiments, the techniques herein allow for a predictive application aware routing engine to be deployed, such as in the cloud, to control routing decisions in a network. For instance, the predictive application aware routing engine may be implemented as part of an SDN controller (e.g., SDN controller 408) or other supervisory service, or may operate in conjunction therewith. For instance, FIG. 4B illustrates an example 410 in which SDN controller 408 includes a predictive application aware routing engine 412 (e.g., through execution of predictive routing process 248). Further embodiments provide for predictive application aware routing engine 412 to be hosted on a router 110 or at any other location in the network.

During execution, predictive application aware routing engine 412 makes use of a high volume of network and application telemetry (e.g., from routers 110a-110b, SD-WAN fabric 404, etc.) so as to compute statistical and/or machine learning models to control the network with the objective of optimizing the application experience and reducing potential down times. To that end, predictive application aware routing engine 412 may compute a variety of models to understand application requirements, and predictably route traffic over private networks and/or the Internet, thus optimizing the application experience while drastically reducing SLA failures and downtimes.

In other words, predictive application aware routing engine 412 may first predict SLA violations in the network that could affect the QoE of an application (e.g., due to spikes of packet loss or delay, sudden decreases in bandwidth, etc.). In other words, predictive application aware routing engine 412 may use SLA violations as a proxy for actual QoE information (e.g., ratings by users of an online application regarding their perception of the application), unless such QoE information is available from the provider of the online application (e.g., via an API, etc.). In turn, predictive application aware routing engine 412 may then implement a corrective measure, such as rerouting the traffic of the application, prior to the predicted SLA violation. For instance, in the case of video applications, it now becomes possible to maximize throughput at any given time, which is of utmost importance to maximize the QoE of the video application. Optimized throughput can then be used as a service triggering the routing decision for specific application requiring highest throughput, in one embodiment. In general, routing configuration changes are also referred to herein as routing "patches," which are typically temporary in nature (e.g., active for a specified period of time) and may also be application-specific (e.g., for traffic of one or more specified applications).

One of the main challenges in networking consists in determining which metric to use in routing for (constrained) shortest path computation. Typically, these approaches have relied on static metrics. For instance, in the Interior Gateway Protocol (IGP), static metrics have been used to reflect delays or bandwidth, or even a combination thereof. In the case of MPLS Traffic Engineering, a second static metric has been added to compute constrain shortest path. Still, all of those metrics have been static, and with no real attempt to reflect the application experience (hour-glass principle) but rather the path property, which should correlate with application experience. Unfortunately, such an approach (although highly scalable) has proven to be of limited efficiency. Some application-aware routing approaches also rely on checking a posteriori whether an SLA is violated using probes, in order to assess the user experience using static SLA templates and then potentially dismiss the use of a path computed by the routing engine.

A key observation herein is that the dynamics of the network KPIs (e.g., loss, delay, jitter, etc.) actually play a key role in the user experience of an online application, beyond simply the absolute value for that KPI. Indeed, the variation of packet loss, or even the jitter, may have an impact on how the user perceives the quality of their experience with the application, even though the absolute value may not exceed a given threshold.

Application-Aware Routing Based on Path KPI Dynamics

The techniques introduced herein allow for routing decisions to be made through the analysis of path KPI dynamics that affect the QoE/application experience metrics of an online application. In contrast with existing approaches where static network KPI are used to compute the best path, new metrics are introduced herein that reflect the path characteristics and are then correlated with the application QoE. Such metrics are then used for best path selection, or even for SLA verification.

Illustratively, the techniques described herein may be performed by hardware, software, and/or firmware, such as in accordance with KPI dynamics analysis process 249, which may include computer executable instructions executed by the processor 220 (or independent processor of interfaces 210) to perform functions relating to the techniques described herein, such as in conjunction with the operation of predictive routing process 248.

Specifically, according to various embodiments a device receives path telemetry data for one or more network paths in a network over which traffic for an online application is conveyed. The device computes time series dynamics for the path telemetry data. The device determines a mapping of the time series dynamics to application experience metrics for the online application. The device routes traffic associated with the online application based on the mapping.

Figure 5:
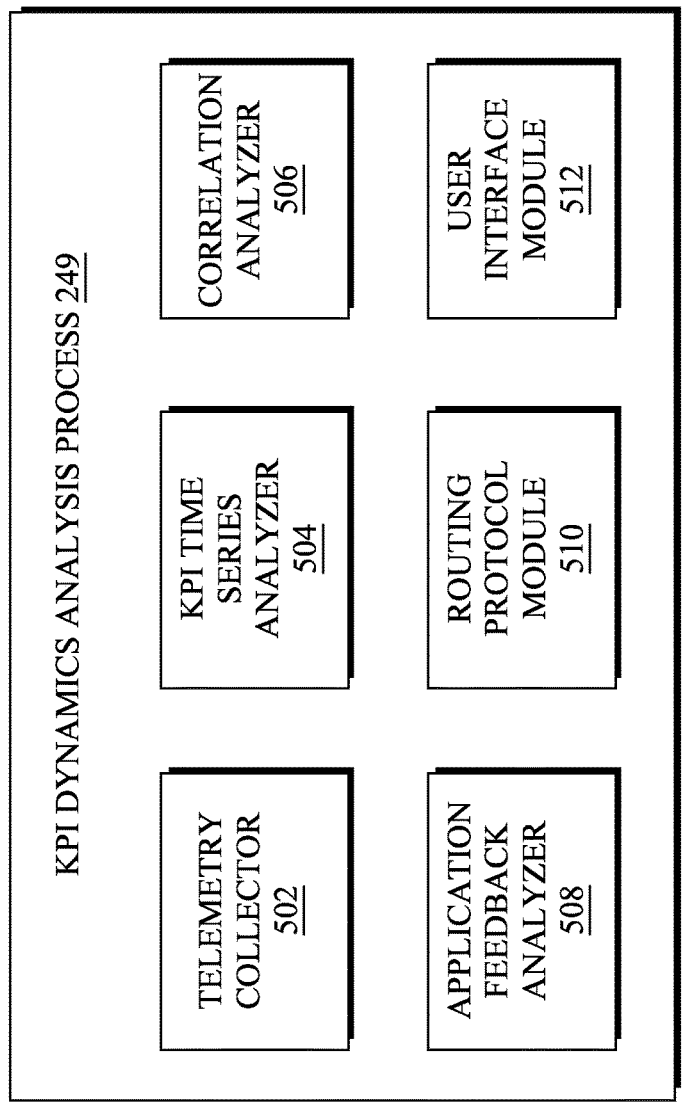
FIG. 5 illustrates an example architecture for application-aware routing based on path key performance indicator (KPI) dynamics.

Operationally, FIG. 5 illustrates an example architecture 500 for application-aware routing based on path key performance indicator (KPI) dynamics, according to various embodiments. At the core of architecture 500 is KPI dynamics analysis process 249, which may be executed by a controller for a network or another device in communication therewith. For instance, KPI dynamics analysis process 249 may be executed by a controller for a network (e.g., SDN controller 408 in FIGS. 4A-4B), a particular networking device in the network (e.g., a router, etc.), another device or service in communication therewith, or the like. In some embodiments, for instance, KPI dynamics analysis process 249 may be used to implement a predictive application aware routing engine, such as predictive application aware routing engine 412, or another supervisory service for the network.

As shown, KPI dynamics analysis process 249 may include any or all of the following components: a telemetry collector 502, a KPI time series analyzer 504, a correlation analyzer 506, an application feedback analyzer 508, a routing protocol module 510, and/or a user interface module 512. As would be appreciated, the functionalities of these components may be combined or omitted, as desired. In addition, these components may be implemented on a singular device or in a distributed manner, in which case the combination of executing devices can be viewed as their own singular device for purposes of executing KPI dynamics analysis process 249.

Certain aspects of the operation of KPI dynamics analysis process 249 relate to the computation of new forms of path dynamics metrics. In contrast with existing techniques where path characteristics are limited to gathering telemetry related to the usual network KPI (e.g., latency, loss and jitter) and their value related to hard thresholds, the objective here is to compute metrics that characterize the dynamics of a path and their relation to observed application QoE.

To that end, telemetry collector 502 may collect path telemetry data for a path regarding measured KPIs such as loss, latency, jitter, etc., at a given frequency Fi for a period of time Ti along each path of interest Pi. This can be done either on a pull basis by sending a request to one or more networking devices for the telemetry data or on a push basis, where the telemetry data is sent to telemetry collector 502, automatically. In one embodiment, telemetry could be gathered by telemetry collector 502 using time based telemetry (streaming). In another embodiment, a (more exhaustive) data gathering campaign may be triggered by telemetry collector 502 to gather a rich set of telemetry variables to a collection of routers in the network.

In yet another embodiment, the techniques herein may be limited to a specific set of paths (paths carrying a given set of (critical) applications, a high volume of traffic, etc.), as configured by a user. In addition, another function of telemetry collector 502 may be to compute time series from the received KPI metrics for the various network paths.

In various embodiments, KPI time series analyzer 504 may compute time series dynamics using the path KPI metrics obtained by telemetry collector 502. More specifically, KPI time series analyzer 504 may extract a set of characteristic metrics from the time series of KPI metrics, which represent the dynamics of those time series. These metrics capture various salient characteristics of the time series, such as their periodicity, predictability, linear-autoregressivity, etc.) over a time span of the network KPIs from telemetry collector 502.

According to various embodiments, some of the key time series dynamics that KPI time series analyzer 504 may compute are as follows:

1.) Spectral entropy (signifying the extent of variability of a metric):

$$H = -\sum_{i=1}^{N} p_i, \log p_i \cdot x_{p_i > 0}$$

where H is the spectral entropy, pi is the power spectral density of a frequency component i. This metric computes the uncertainty of the binned distribution, constructed from the network KPI time series. In addition, the higher the value of this metric, the higher the degree of uncertainty.

2.) Approximate entropy (denotes the predictability of a metric):

$$E = \phi^m(r) - \phi^{m+1}(r), \phi^m(r) \propto \sum_{i=1}^{N-m+1} \log(C_i^m(r))$$

Here, the time series is broken down into segments of "m" steps (sliding window). Each segment is indexed by r. For example, for a time series y=[t0, t1, . . . , tn], r=1 implies the segment of a time series [t0, t1, . . . , tm−1] and r=2 is the segment [t1, t2, . . . , tm]. This metric tries to compute the extent of predictability whereby the higher the is value of this metric, the lower the predictability of the time series.

3.) Normalized cid_ce

This estimates the complexity of a time series by measuring how many peaks and valleys they have. Hence, is useful to quantify predictability of a signal. This metric may be computed as the normalized squared difference between successive values of the KPI time series:

$$\sqrt{\sum_{i=1}^{n-1}(x_i - x_{i-1})^2}$$

4.) Mean Abs Sum of Changes (MACOS) (Predictability):

This estimates the average differences (absolute) between successive elements of a time series, thus giving an estimate of how much time series changes at each step:

$$MACOS = \frac{\sum_{i=1}^{N-1} |x_{i+1} - x_i|}{N}$$

5.) Linear Trend:

This estimate computes the statistical significance of a time series having a linear trend, where the stronger the trend, the better will be the predictability. The metrics p-value, slope, intercept are computed from the regression below:

$$\sum_{i=1}^{N}(x_i - \alpha \cdot t_i - \beta)^2$$

If the p-value is less than 0.05 (or a suitable alpha) level, it can be inferred with confidence that the coefficient corresponding to the temporal trend is non-zero (which means the time series has a linear temporal trend).

6.) Linear "Auto-regressiveness":

$$X_t = \varphi_0 + \sum_{i=1}^{k} \varphi_i \cdot X_{t-i} + \epsilon_t$$

This metric computes the coefficients of an auto-regressive process, which is fit with the KPI time series data. This metric tries to estimate how much linear dependence the KPI time series has on the immediate past value, thereby determining how accurately the data generating process be represented by an AR model.

7.) Welch Spectral Density (Periodicity):

Spectral density estimates the strength of the signal at different periods (seasonality periods such as 1 hour, 1 day, etc.). This may be computed using the Fast Fourier Transform (FFT) as shown below:

$$X_k = \sum_{i=0}^{N-1} x_i \cdot e^{-i\frac{2\pi k i}{N}}$$

The FFT is computed on the network metric KPI and the Welch Spectral Density computed from it, representing the periodicity of the time series.

The above embodiments of finding the time series features helps in characterize underlying dynamic behavior of the network KPIs over time, thus helping in the accessing characteristics of different paths. This naturally helps in not only understanding paths, but also choosing the right forecasting mechanism based on the complexity of the time series.

Figure 6A:
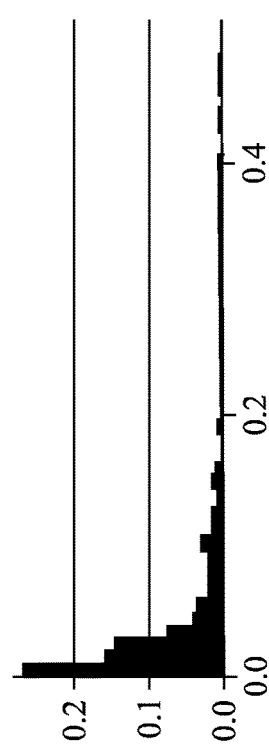
Figure 6B:
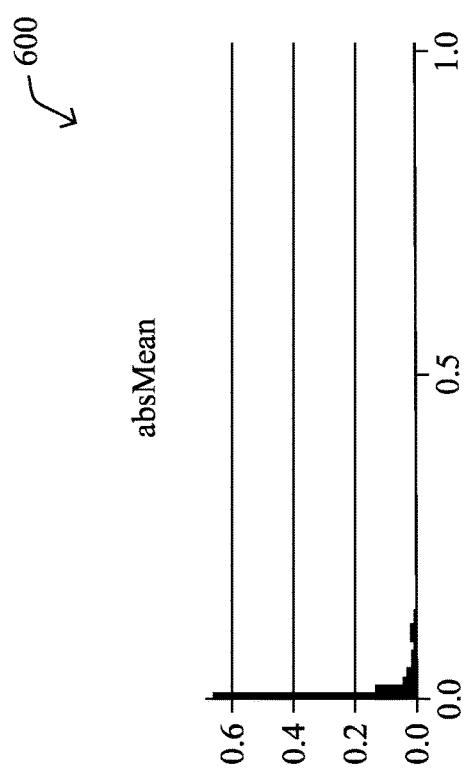
Figure 6C:
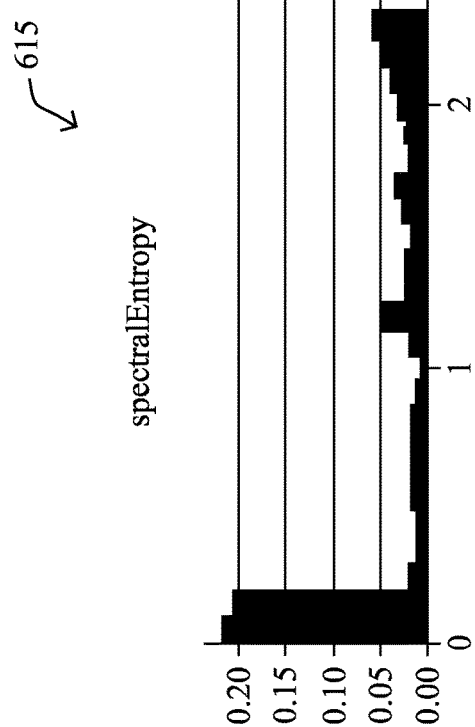
Figure 6D:
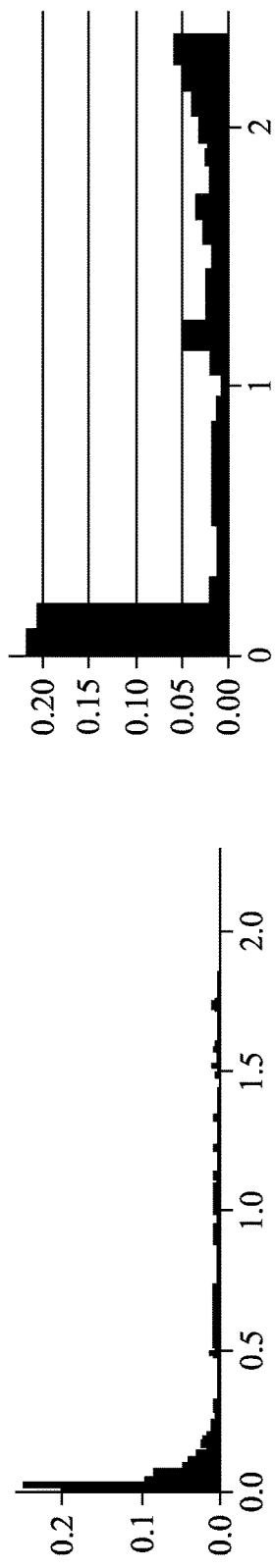
Figure 6I:
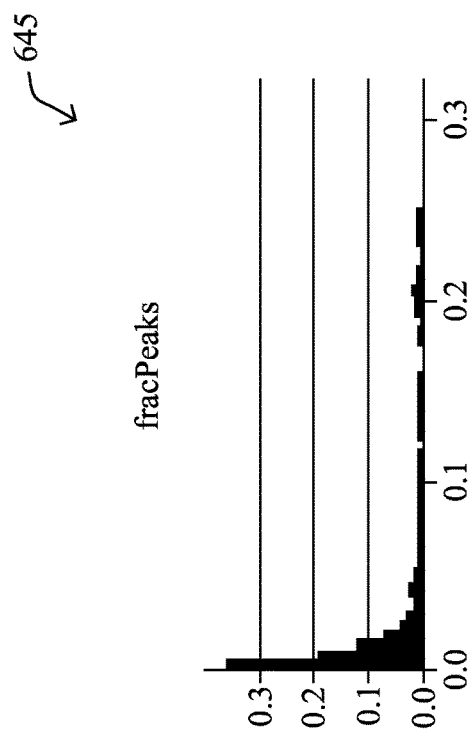
Figure 6J:
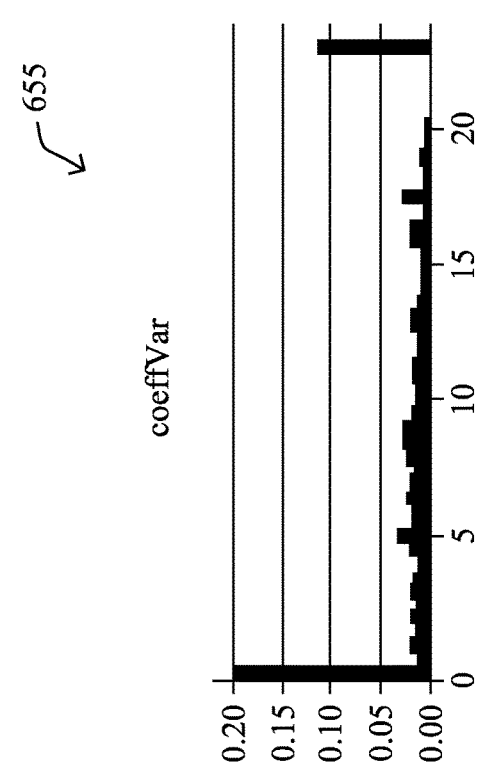
Figure 6K:
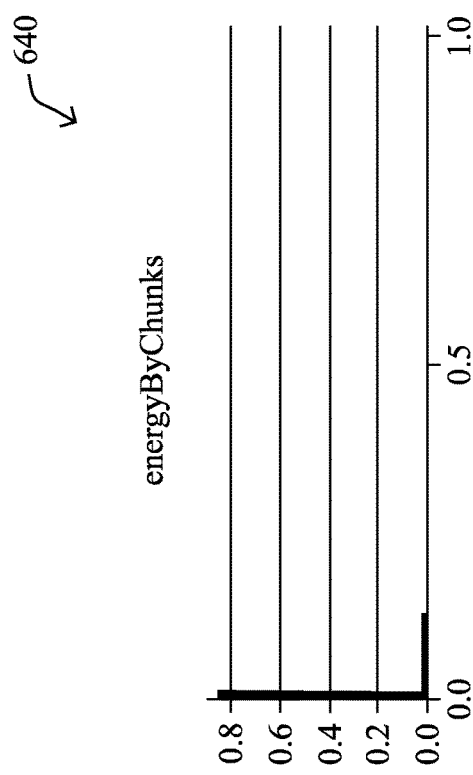
Figure 6L:
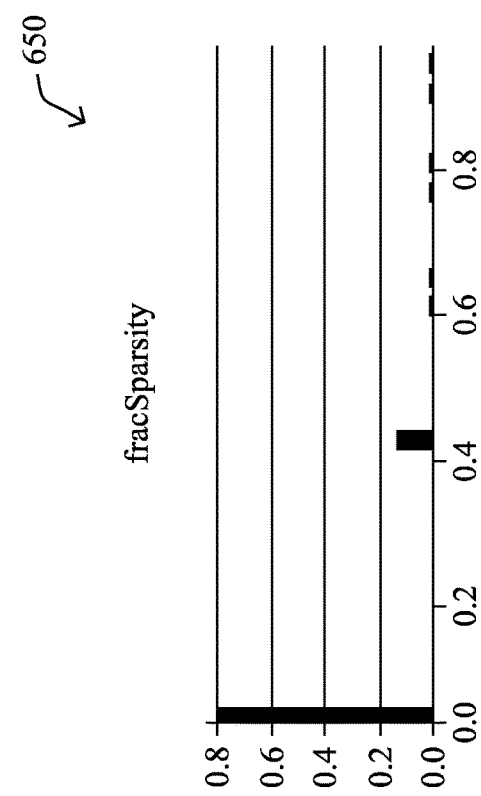

FIGS. 6A-6L illustrates example plots of KPI dynamics, according to various embodiments. More specifically, FIGS. 6A-6I illustrate distributions of different time series characteristic metrics extracted for a set of network KPIs, representing the is dynamics of the underlying time series. FIG. 6A shows a plot 600 of the distribution of the absolute mean of the time series (absMean). FIG. 6B shows a plot 605 of the distribution of the standard deviation of the time series (std). FIG. 6C shows a plot 610 of the distribution of the approximate entropy of the time series approxEntropy). FIG. 6D shows a plot 615 of the distribution of the spectral entropy of the time series (spectralEntropy). FIG. 6E shows a plot 620 of the distribution of the Welch spectral density of the time series (spktWelchDensity). FIG. 6F shows a plot 625 of the distribution of the median autoregressive coefficient of the time series (arCoeffMedian). FIG. 6G shows a plot 630 of the distribution of the absolute maximum of the autoregressive coefficient of the time series (acfAbsMax). FIG. 6H shows a plot 635 of the distribution of the fraction of the time series above its mean (fracAboveMean). FIG. 6I shows a plot 640 of the distribution of energy by chunks of the time series (energyByChunks). FIG. 6J shows a plot 645 of the distribution of fraction of peaks of the time series (fracPeaks). FIG. 6K shows a plot 650 of the distribution of fraction of sparsity of the time series (fracSparsity). FIG. 6L shows a plot 655 of the distribution of vector autoregression coefficient of the time series (coeffVar).

As would be appreciated, the nature of the distributions helps to discover/represent the underlying dynamics of the time series for the KPI. For example, the heavy-tailed distribution of the spectral entropy in plot 615 in FIG. 6D indicates the presence of noisy KPIs. Similarly, the long-tail of the Welch density in plot 620 in FIG. 6E indicates the presence of periodic behavior by the KPI.

Referring again to FIG. 5, correlation analyzer 506 may determine the correlation between the time series dynamic metrics computed by KPI time series analyzer 504. Indeed, since the objective of the techniques herein is to determine which of these time series dynamics can be used as proxy of the application QoE, correlation analyzer 506 may act as a filtering mechanism to determine the correlations between these metrics.

Figure 7:
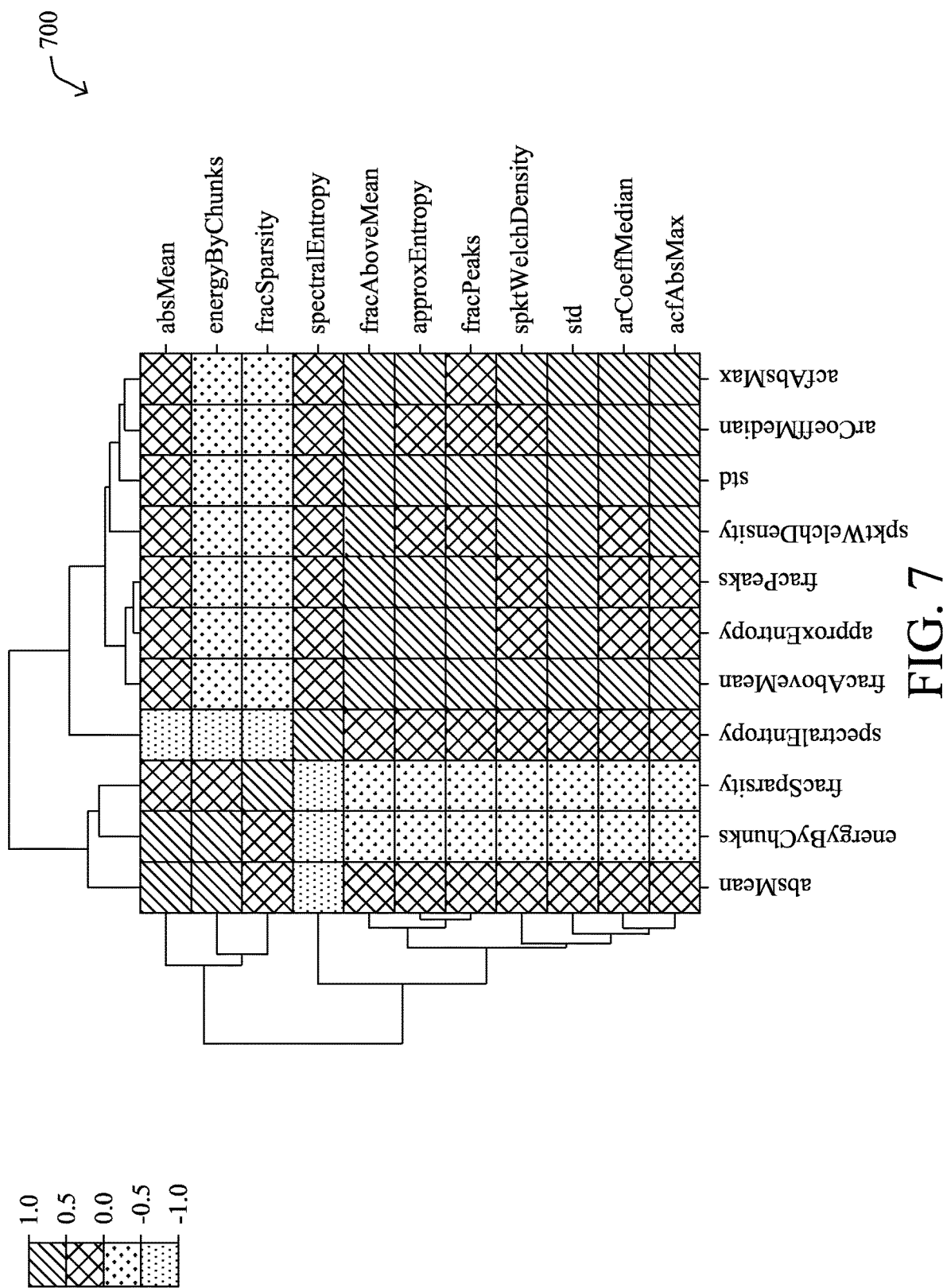
FIG. 7 illustrates an example correlation matrix of KPI dynamics.

FIG. 7 illustrates an example correlation matrix 700 of KPI dynamics, according to various embodiments. As shown, correlation analyzer 506 may compute the pair-wise correlations is computed between each pair of features (across all paths), for any or all of the time series dynamic metrics shown in FIGS. 6A-6L. Example correlation metrics that could be used include Pearson's, Kendall's or Spearman's correlation coefficient.

The correlation matrix 700 computed by correlation analyzer 506 could also be clustered to show which set of these time series features are highly correlated. This can be done by clustering correlation matrix 700 (e.g., using a clustermap). From the clusters of the metrics, correlation analyzer 506 can identify one or more key metrics as a representative of the QoS metric.

For example, it can be seen in FIG. 7 that the fraction of points above mean (fracAboveMean), approximate entropy (approxEntropy), and fraction of peaks (fracPeaks) have very high positive correlation, thus implying that the entropy in the data is possibly because of high peaks. In turn, correlation analyzer 506 can select those time series dynamics/metric(s) that have relatively high correlation with other metrics, to represent all of these dynamics, collectively.

Referring yet again to FIG. 5, application feedback analyzer 508 may be configured to determine a mapping between the time series dynamics for the KPI time series and the application experience/QoE, for a path $P_i$. In some embodiments, such application experience metrics may be based on application feedback gathered using the application itself. For instance, Microsoft online applications may maintain a repository of user experience feedback using a set of labels (Good, Degraded, Bad, No opinion) for each O365 applications (Teams, SharePoint, Exchange, etc.). At this point, application feedback analyzer 508 may use correlation metrics are used to map the various path dynamics metrics to the various (user/application experience) labels.

A key aspect of application feedback analyzer 508 is its ability to extract a set of path metrics characterizing the path dynamics that truly influence the user application. Note that such an approach is true paradigm shift where path metrics are computed that are known as influencing the application experience as opposed to using static path metrics not related to application experience.

The computation of correlation by application feedback analyzer 508 may be rerun upon the expiration of a configurable timer, on detection of major path changes (e.g., by monitoring a BGP routing update reflecting that a path change took place), or even on detection of a sudden change of the user experience for a given application (MoS scores, distribution of labels, etc.).

It is also worth noting that the mapping between application experience and path dynamics metric may be application specific. Indeed, consider the case of some voice CODEC: the sensitivity to jitter may likely be CODEC specific, meaning that the user experience may vary according to the CODEC in use for a given set of network conditions. This means that the path dynamics metric may be tied to the nature of the traffic carried over such path (which is unusual with traditional approaches where link/path characteristics are never tied to the nature of the application carried over such paths).

In another embodiment, application feedback analyzer 508 may train a machine learning model (e.g., a neural network-based classifier) to predict the application user experience using the path dynamics metrics. The Precision/Recall of the classifier may then be used as a strong indicator of the predictive power a path dynamics metric has on the user experience.

As noted above, KPI dynamics analysis process 249 may be implemented at various locations in the network, in a centralized or distributed manner. In one embodiment, the time series dynamics metrics may be computed on-premise and then reported to the central engine using telemetry streaming (e.g., by having the telemetry exporter execute KPI time series analyzer 504). Such an approach would allow for a dramatic reduction of the volume of data and would be required should the path be computed on premise using such metrics. To that end, the central engine evaluates is whether the metric could be computed by the router/switch considering the local resources available. In another embodiment, such metric could be computed by the central engine and then updated upon detecting a change or upon the expiration of the configurable timers by the central engine.

Another potential component of KPI dynamics analysis process 249 is routing protocol module 510, which allows for using the mapping of KPI dynamics and application QoE to be leveraged by a routing protocol, for purposes of making routing decisions. For instance, if there is a strong correlation between one or more path dynamic metrics and the QoE, those metric(s) could be used by a dynamic routing protocol, such as interior gateway protocol (IGP), border gateway protocol (BGP), or the like, for path selection. In another embodiment, in IoT networks, a protocol such as RPL may make use of this information for shortest path selection. As an example, a slightly longer path with low approximate entropy may be preferred to a shortest path with high approximate entropy, if doing so would increase the application experience. Similarly, the metric attached to an MPLS Traffic Engineering tunnel may be used for triggering the use of the tunnel using Forwarding Adjacency. In the case of BGP, a new non-transitive attribute may be used to reflect the property of the path within an Autonomous System (AS).

KPI dynamics analysis process 249 may also include user interface module 512, which allows it to show the benefit of the dynamics metrics on the user application experience, had the path KPI time series dynamics been used for path selection. For instance, user interface module 512 may provide an indication of the mapping of time series dynamics to QoE for review by an administrator, as well as a computed benefit of using the dynamics to control routing decisions for traffic of the application. Such a benefit could be computed, for instance, by computing the amount of traffic sent other a given path using the existing path selection metric as opposed to path selected using the path dynamics metrics introduced herein. This would allow 512, to report the overall benefit of relying on them for routing decisions in terms of application user experience.

In some embodiments, user interface module 512 may allow the user to configure is the dynamics metric for Application Aware Routing (AAR), in reactive mode. In existing SD-WAN networks, an administrator typically configures a set of SLA templates that must be met for a path to be eligible to carrying a specific traffic type. For example, they may configure a SLA template: Loss <3%, Delay <150 ms, etc. In the context of the techniques herein, user interface module 512 may show the level of correlation between the user experience for an Application A and a time series dynamics metric for a given path used to carry such application. The user would be able to specify that the routing mechanism should make use of such dynamics metrics to validate the SLA (reactive mode). In this case, the system would automatically compute the conditions for the dynamics metrics specified in this document to be met so as not to violate the application SLA.

Instead of validating whether the SLA are met using networking centric KPI, user interface module 512 may compute a model capable of matching the SLA with the KPI time series dynamics introduced herein. One approach might be to train a classifier using the dynamics metrics that correlate with the QoS, to predict the probability for the SLA to be met (e.g., using logistic regression) In this case, it would become possible to use the dynamics not only to compute the best path, but also to check whether the SLA are met within a system that still relies on using traditional network centric KPIs.

Figure 8:
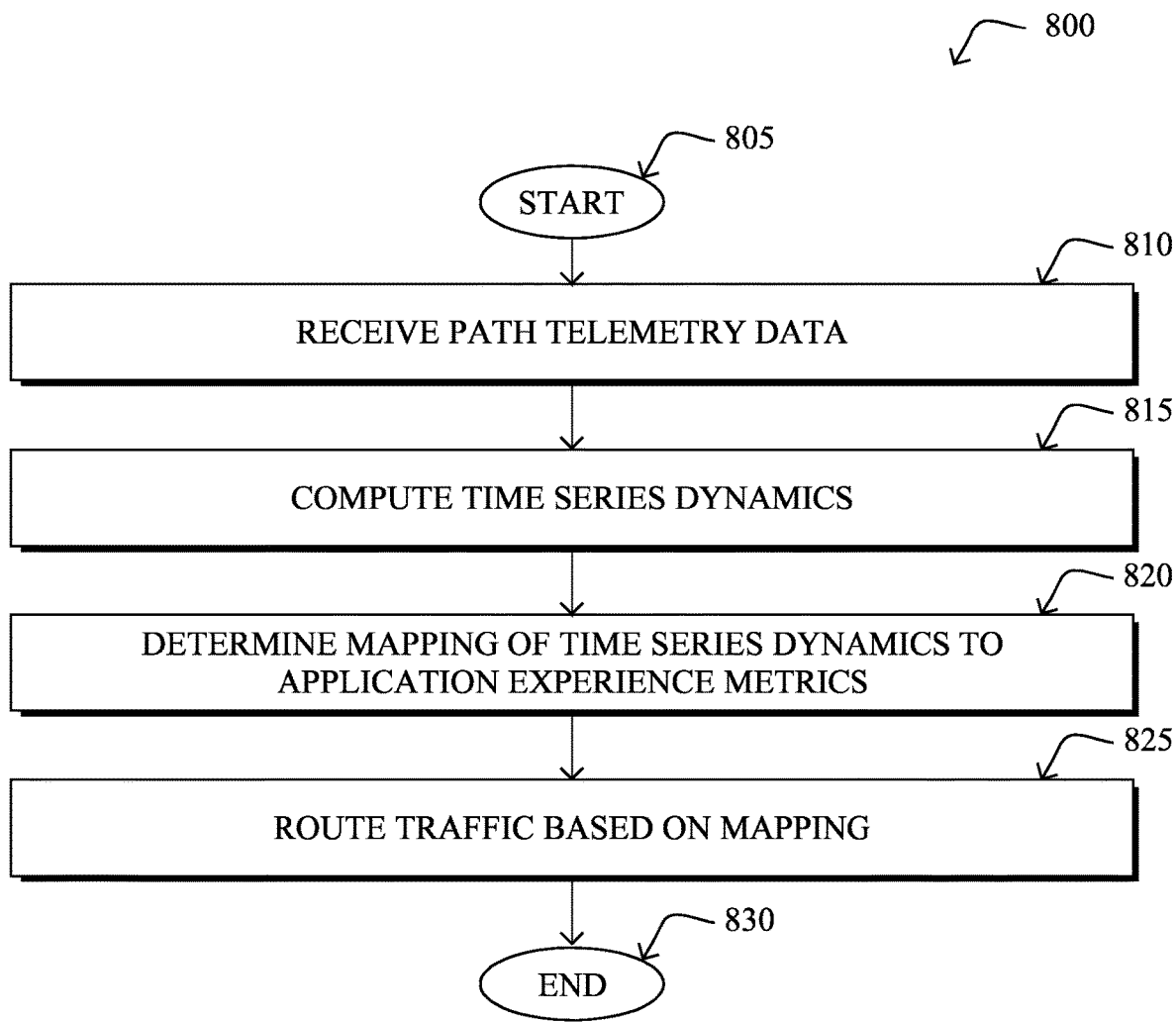
FIG. 8 illustrates an example simplified procedure for application-aware routing based on path KPI dynamics.

FIG. 8 illustrates an example simplified procedure 800 (e.g., a method) procedure for recommending a configuration change for a portion of a network, in accordance with one or more embodiments described herein. For example, a non-generic, specifically configured device (e.g., device 200), such as controller for a network (e.g., an SDN controller, an edge router, or other device in communication therewith) or other supervisory device, may perform procedure 800 by executing stored instructions (e.g., KPI dynamics analysis process 249). The procedure 800 may start at step 805, and continues to step 810, where, as described in greater detail above, the device may receive path telemetry data for one or more network paths in a network over which traffic for an online application is conveyed (e.g., traffic for an SaaS application). Such path telemetry data may comprise, for instance, measured loss, latency, or jitter along the one or more is paths.

At step 815, as detailed above, the device may compute time series dynamics for the path telemetry data. In various embodiments, the time series dynamics may be based on one or more of: a spectral entropy, an approximate entropy, a Welch spectral density, a measure of complexity, a measure of predictability, a linear trend, or a linear auto-regressiveness.

At step 820, the device may determine a mapping of the time series dynamics to application experience metrics for the online application, as described in greater detail above. In some embodiments, the application experience metrics for the online application are based on feedback provided by users of the online application. For instance, users of the online application may rate their satisfaction with the online application (e.g., on a scale of 0-5 stars, etc.), which can be provided by the online application to the device for analysis (e.g., via an API). In another embodiment, the device may determine the mapping in part by selecting two or more time series dynamics for the mapping based on their correlations with one another. In one embodiment, the device may also provide an indication of the mapping to a user interface for display.

At step 825, as detailed above, the device may route traffic associated with the online application based on the mapping. In various embodiments, the device may do so either directly (e.g., as in the case of the device being a router, SDN controller, etc.) or indirectly, whereby the device provides the mapping to another device responsible for routing decisions. In one embodiment, the device may route the traffic in part by using the time series dynamics as a shortest path metric for a routing protocol used in the network (e.g., IGP, BGP, RPL, etc.). In another embodiment, the device may route the traffic in part by modeling a relationship between the mapping and an SLA. Procedure 800 then ends at step 830.

It should be noted that while certain steps within procedure 800 may be optional as described above, the steps shown in FIG. 8 are merely examples for illustration, and certain other steps may be included or excluded as desired. Further, while a particular is order of the steps is shown, this ordering is merely illustrative, and any suitable arrangement of the steps may be utilized without departing from the scope of the embodiments herein.

While there have been shown and described illustrative embodiments that provide for application-aware routing based on path KPI dynamics, it is to be understood that various other adaptations and modifications may be made within the spirit and scope of the embodiments herein. For example, while certain embodiments are described herein with respect to using certain models for purposes of predicting application experience metrics, SLA violations, or other disruptions in a network, the models are not limited as such and may be used for other types of predictions, in other embodiments. In addition, while certain protocols are shown, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true spirit and scope of the embodiments herein.

The invention claimed is:

1. A method comprising:
   receiving, at a device, path telemetry data for one or more network paths in a network over which traffic for an online application is conveyed;
   computing, by the device, time series dynamics for the path telemetry data;
   determining, by the device, a mapping of the time series dynamics to application experience metrics for the online application; and
   routing, by the device, traffic associated with the online application based on the mapping.

2. The method as in claim 1, wherein the application experience metrics for the online application are based on feedback provided by users of the online application.

3. The method as in claim 1, wherein routing traffic associated with the online application based on the mapping comprises:
   causing the time series dynamics to be used by a routing protocol in the network to make routing decisions.

4. The method as in claim 1 wherein determining the mapping of the time series dynamics to application experience metrics for the online application comprises:
   selecting two or more time series dynamics for the mapping based on their correlations with one another.

5. The method as in claim 1, further comprising:
   providing, by the device, an indication of the mapping to a user interface for display.

6. The method as in claim 1, wherein the time series dynamics are based on a spectral entropy, an approximate entropy, or a Welch spectral density.

7. The method as in claim 1, wherein the time series dynamics are based on a measure of complexity, a measure of predictability, a linear trend, or linear auto-regressiveness.

8. The method as in claim 1, wherein routing traffic associated with the online application based on the mapping comprises:
   modeling a relationship between the mapping and a service level agreement.

9. The method as in claim 1, wherein the path telemetry data comprises measured loss, latency, or jitter along the one or more network paths.

10. The method as in claim 1, wherein the online application is a software-as-a-service (SaaS) application.

11. An apparatus, comprising:
    one or more network interfaces;
    a processor coupled to the one or more network interfaces and configured to execute one or more processes; and
    a memory configured to store a process that is executable by the processor, the process when executed configured to:
      receive path telemetry data for one or more network paths in a network over which traffic for an online application is conveyed;
      compute time series dynamics for the path telemetry data;
      determine a mapping of those time series dynamics to application experience metrics for the online application; and
      route traffic associated with the online application based on the mapping.

12. The apparatus as in claim 11, wherein the application experience metrics for the online application are based on feedback provided by users of the online application.

13. The apparatus as in claim 11, wherein the apparatus routes the traffic associated with the online application based on the mapping by:
    causing the time series dynamics to be used by a routing protocol in the network to make routing decisions.

14. The apparatus as in claim 11, wherein the apparatus determines the mapping of the time series dynamics to application experience metrics for the online application by:
    selecting two or more time series dynamics for the mapping based on their correlations with one another.

15. The apparatus as in claim 11, wherein the process when executed is further configured to:
    provide an indication of the mapping to a user interface for display.

16. The apparatus as in claim 11, wherein the time series dynamics are based on a spectral entropy, an approximate entropy, or a Welch spectral density.

17. The apparatus as in claim 11, wherein the time series dynamics are based on a measure of complexity, a measure of predictability, a linear trend, or linear auto-regressiveness.

18. The apparatus as in claim 11, wherein the apparatus routes the traffic associated with the online application based on the mapping in part by:
    modeling a relationship between the mapping and a service level agreement.

19. The apparatus as in claim 11, wherein the path telemetry data comprises measured loss, latency, or jitter along the one or more network paths.

20. A tangible, non-transitory, computer-readable medium storing program instructions that cause a device to execute a process comprising:
- receiving, at a device, path telemetry data for one or more network paths in a network over which traffic for an online application is conveyed;
- computing, by the device, time series dynamics for the path telemetry data;
- determining, by the device, a mapping of the time series dynamics to application experience metrics for the online application; and
- routing, by the device, traffic associated with the online application based on the mapping.

* * * * *

UNITED STATES PATENT AND TRADEMARK OFFICE
CERTIFICATE OF CORRECTION

| | | |
|---|---|---|
| PATENT NO. | : 11,658,904 B1 | Page 1 of 1 |
| APPLICATION NO. | : 17/532114 | |
| DATED | : May 23, 2023 | |
| INVENTOR(S) | : Jean-Philippe Vasseur | |

It is certified that error appears in the above-identified patent and that said Letters Patent is hereby corrected as shown below:

In the Specification

Column 7, Line 47, please amend as shown:
(e.g., ADSL, 4G, 5G, etc.) in all cases, as well as various Column 8, Line 30, please amend as shown:
workloads. On the network side, SD-WAN provides a high Column 8, Line 61, please amend as shown:
reach a destination IP address. Various attempts have been Column 12, Line 27, please amend as shown:
extent of predictability whereby the higher the value of Column 13, Line 40, please amend as shown:
senting the dynamics of the underlying time series. FIG.

Column 15, Line 22, please amend as shown:
whether the metric could be computed by the router/

Column 15, Line 63, please amend as shown:
allow the user to configure the dynamics metric for Column 16, Line 39, please amend as shown:
one or more paths.

Column 17, Line 12, please amend as shown:
Further, while a particular order of the steps is shown, this Signed and Sealed this
Twenty-second Day of August, 2023

Katherine Kelly Vidal
*Director of the United States Patent and Trademark Office*